United States Patent
Suh et al.

(10) Patent No.: US 10,721,040 B2
(45) Date of Patent: Jul. 21, 2020

(54) ORTHOGONAL SEQUENCE BASED REFERENCE SIGNAL DESIGN FOR NEXT GENERATION WLANS

(71) Applicants: Jung Hoon Suh, Ottawa (CA); Osama Aboul-Magd, Kanata (CA); Kwok Shum Au, Ottawa (CA)

(72) Inventors: Jung Hoon Suh, Ottawa (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/178,180

(22) Filed: Nov. 1, 2018

(65) Prior Publication Data
US 2020/0145157 A1 May 7, 2020

(51) Int. Cl.
*H04L 5/00* (2006.01)
*H04L 27/26* (2006.01)
*H04W 84/12* (2009.01)

(52) U.S. Cl.
CPC .......... *H04L 5/0048* (2013.01); *H04L 5/0044* (2013.01); *H04L 27/2601* (2013.01); *H04W 84/12* (2013.01)

(58) Field of Classification Search
CPC . H04L 5/0048; H04L 5/0044; H04L 27/2601; H04W 84/12
See application file for complete search history.

(56) References Cited

U.S. PATENT DOCUMENTS

| | | | |
|---|---|---|---|
| 2008/0232488 A1* | 9/2008 | Sandell | H04L 25/0206 375/260 |
| 2015/0326408 A1* | 11/2015 | Vermani | H04L 5/0048 370/328 |
| 2016/0088599 A1* | 3/2016 | Yang | H04W 72/044 370/329 |
| 2016/0143038 A1 | 5/2016 | Goto et al. | |
| 2016/0156497 A1* | 6/2016 | Yang | H04L 25/0204 370/328 |
| 2017/0026952 A1* | 1/2017 | Park | H04L 5/00 |

(Continued)

FOREIGN PATENT DOCUMENTS

| | | |
|---|---|---|
| CN | 108270537 A | 7/2018 |
| WO | 2018082071 A1 | 5/2018 |

OTHER PUBLICATIONS

Mujtaba, TGn Sync Proposal Technical Specification, May 18, 2005, pp. 1-131.

*Primary Examiner* — Maharishi V Khirodhar
*Assistant Examiner* — Kenneth P Hunt
(74) *Attorney, Agent, or Firm* — BCF LLP

(57) ABSTRACT

The present invention discloses methods and devices for communicating data in a Wireless Local Area Network (WLAN). An orthogonal frequency division multiplexing (OFDM) frame is communicated between an access point (AP) and a station (STA). The OFDM frame comprises a preamble section and a data payload section. The data payload section includes communication payload data and reference signal (RS) data pertaining to a wireless channel. The RS data comprises one of an orthogonal sequence-based reference signal (OSRS), a quasi-orthogonal sequence-based reference signal (QOSRS), and a tone interleaved long training field (TIL)-based RS.

36 Claims, 6 Drawing Sheets

(56) References Cited

U.S. PATENT DOCUMENTS

| | | | |
|---|---|---|---|
| 2017/0033963 A1* | 2/2017 | Li | H04L 27/2615 |
| 2017/0279640 A1* | 9/2017 | Yang | H04L 1/0003 |
| 2017/0359812 A1* | 12/2017 | Park | H04W 72/0453 |
| 2019/0097850 A1* | 3/2019 | Kenney | H04L 5/0048 |
| 2019/0141570 A1* | 5/2019 | Verma | H04W 28/065 |
| 2019/0260621 A1 | 8/2019 | Jinnan Liu et al. | |
| 2019/0261369 A1* | 8/2019 | Verma | H04B 7/0619 |
| 2019/0281614 A1* | 9/2019 | Chen | H04L 5/0041 |
| 2020/0008185 A1* | 1/2020 | Chen | H04B 7/046 |

* cited by examiner

- With No Interpolation

- With a Mid-tone Interpolation

Real Part

{1, .7071, -.7071, 0, 0, .7071, -.7071, -1 }    {-.7071, -1, 1, .7071, -.7071, 0, 0, .7071 }
{0, .7071, -.7071, -1, 1, .7071, -.7071, 0 }    {-.7071, 0, 0, .7071, -.7071, -1, 1, .7071 }

{1, -.7071, .7071, 0, 0, -.7071, .7071, -1 }    {.7071, -1, 1, -.7071, .7071, 0, 0, -.7071 }
{0, -.7071, .7071, -1, 1, -.7071, .7071, 0 }    {.7071, 0, 0, -.7071, .7071, -1, 1, -.7071 }

{1, -.7071, .7071, 0, 0, -.7071, .7071, -1 }    {.7071, -1, 1, -.7071, .7071, 0, 0, -.7071 }
{0, -.7071, .7071, -1, 1, -.7071, .7071, 0 }    {.7071, 0, 0, -.7071, .7071, -1, 1, -.7071 }

{1, .7071, -.7071, 0, 0, .7071, -.7071, -1 }    {-.7071, -1, 1, .7071, -.7071, 0, 0, .7071 }
{0, .7071, -.7071, -1, 1, .7071, -.7071, 0 }    {-.7071, 0, 0, .7071, -.7071, -1, 1, .7071 }

Imaginary Part

{0, -.7071, -.7071, 1, -1, .7071, .7071, 0 }    {.7071, 0, 0, -.7071, -.7071, 1, -1, .7071 }
{-1, .7071, .7071, 0, 0, -.7071, -.7071, 1 }    {-.7071, 1, -1, .7071, .7071, 0, 0, -.7071 }

{0, -.7071, -.7071, -1, 1, .7071, .7071, 0 }    {.7071, 0, 0, -.7071, -.7071, -1, 1, .7071 }
{1, .7071, .7071, 0, 0, -.7071, -.7071, -1 }    {-.7071, -1, 1, .7071, .7071, 0, 0, -.7071 }

{0, .7071, .7071, 1, -1, -.7071, -.7071, 0 }    {-.7071, 0, 0, .7071, .7071, 1, -1, -.7071 }
{-1, -.7071, -.7071, 0, 0, .7071, .7071, 1 }    {.7071, 1, -1, -.7071, -.7071, 0, 0, .7071 }

{0, .7071, .7071, -1, 1, -.7071, -.7071, 0 }    {-.7071, 0, 0, .7071, .7071, -1, 1, -.7071 }
{1, -.7071, -.7071, 0, 0, .7071, .7071, -1 }    {.7071, -1, 1, -.7071, -.7071, 0, 0, .7071 }

ORTHOGONAL SEQUENCE BASED REFERENCE SIGNAL DESIGN FOR NEXT GENERATION WLANS

TECHNICAL FIELD

The present invention relates generally to the field of wireless communication systems, and in particular, to orthogonal sequence-based reference signal design and its content indication for next generation Wireless Local Area Networks (WLANs).

BACKGROUND

The Institute of Electrical and Electronics Engineers (IEEE) wireless 802.11 standard is capable of supporting 8 spatial streams. The next generation WLAN, which may be referred to as Extreme High Throughput (EHT), is expected to support 16 streams.

According to known 802.11 Long Training Field (LTF) schemes, 16 LTF symbols are required to support channel estimation and Channel State Information (CSI) calculation for the 16 streams. When the 16 LTF symbols are required for the channel estimation, the length of the LTF symbols may be as long as 256 μs, which may result in substantial overhead.

Therefore, there is a need to develop certain mechanisms to support 16 stream channel estimation and to reduce the overhead at the same time.

SUMMARY

An object of the present disclosure is to provide an orthogonal sequence based reference signal design and its indication for next generation WLANs.

Generally stated, the present disclosure provides methods and devices for supporting increased data stream capacities and effectively communicating the same in a Wireless Local Area Network (WLAN). To this end, an orthogonal frequency division multiplexing (OFDM) frame is communicated between an access point (AP) and a station (STA). The OFDM frame comprises a preamble section and a data payload section. The data payload section includes communication payload data and reference signal (RS) data pertaining to a wireless channel. The RS data comprises a plurality of data tones segmented into tone blocks, the RS data comprising one of: an orthogonal sequence-based reference signal (OSRS) that includes orthogonal tone blocks, a quasi-orthogonal sequence-based reference signal (QOSRS) that includes quasi-orthogonal tone blocks, and a tone interleaved long training field (TIL)-based RS that includes interleaved tone patterns with equidistant tone spacing.

In accordance with an aspect of the present disclosure, the RS data may utilize 240 data tones for transmission and the OFDM frame may comprise an OFDM symbol including 5 direct current (DC) tones and 11 guard tones. The RS data may include channel estimation information.

In accordance with an aspect of the present disclosure, the 240 data tones may be segmented into 15 tone blocks with 16 tones in each tone block.

In an embodiment of the present disclosure, for the OSRS, each tone block may be represented by $B_i^k$, where i represents stream index and k represents the block index and wherein the $k^{th}$ tone block for stream i and the $k^{th}$ tone block for stream j are mutually orthogonal, represented as $B_i^k \perp B_j^k$. For the QOSRS, each tone block is represented by $B_i^k$, where i represents stream index and k represents the block index and wherein the inner product between two tone blocks is represented by the following relationship:

$\|(B_i^k)^H B_j^k\| \leq 4$, when i and j are different.

In accordance with an aspect of the present disclosure, for the TIL-based RS, the RS interleaved tone pattern for each stream may be different with the equidistant tone spacing. Further, a channel smoothing scheme may be applied to the data tones. The channel smoothing scheme may comprise Wiener filtering or linear interpolation of the data tones.

In an embodiment of the present disclosure, the preamble section may include a 2 bit indication to identify a size of High Efficiency-Long Training Field (HE-LTF) and the Guard Interval (GI) duration. Further, the preamble section may include additional bits to indicate the length 8 OSRS or the length 16 OSRS or TIL based RS.

In accordance with an aspect of the present disclosure, a channel estimation process may be performed to the communication payload data in accordance with the data payload section of the OFDM frame.

Therefore, the received signal for the $k^{th}$ tone block ($Y^k$) may be characterized by the following equation:

$$Y^k = \sum_{i=0}^{N-1} h_i B_i^k + n$$

in which, the scalar $h_i$ value represents $h_i$ is the channel parameter for the $i^{th}$ stream and n represents Additive White Gaussian Noise (AWGN). The scalar $h_i$ value may be obtained by evaluating all of the $h_i^k$ values based on the following equation, $h_i^k = (B_i^k)^H Y^k / N$ where N is the number of total streams that have been transmitted. The evaluation of the $h_i^k$ values to arrive at the scalar $h_i$ value may be achieved by performing the inner product processing of the $B_i^k$ and $Y^k$ vectors.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE DRAWINGS

Embodiments of the present disclosure will be described by way of example only, with reference to the accompanying drawings.

Like numerals represent like features on the various drawings. It should also be noted that, unless otherwise explicitly specified herein, the drawings are not to scale.

DETAILED DESCRIPTION

A detailed description of the present disclosure will be discussed with respect to the accompanying figures. The embodiments of the concepts disclosed herein are intended to be illustrative, and should not be understood to limit the scope of the present invention.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

Basic WLAN Architecture

Figure 1:
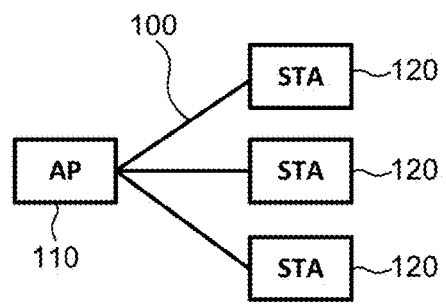
FIG. 1 is a schematic diagram of prior art method of establishing communication between mobile stations (STAs) and an access point (AP).

FIG. 1 illustrates a wireless network 100, including an access point (AP) 110 and a plurality of wireless stations (STA) 120. As shown, wireless network 100 depicts multiple STAs 120 capable of communicating with AP 110 and operating under a Multiple User-Physical Layer Convergence Protocol (PLCP) Protocol Data Unit (MU-PPDU) scheme. For the case where is only one STA 120, wireless system 100 operates under a Single User-PPDU (SU-PPDU) scheme.

AP 110 may embody various known suitable components capable of providing wireless access communications to, and from, STA 120. Moreover, AP 110 may be configured as a base station, an evolved NodeB (eNB), a femtocell, a Wi-Fi AP, as well as any other device capable of providing wireless communication access to STA 120.

Similarly, STA 120 may comprise any suitable component capable of establishing a wireless connection with AP 110, and may be configured as mobile device, user equipment (UE), or other wirelessly-enabled device.

Wireless Communication Frame Format

In communications between AP 110 and STA 120, the information conveyed may be formatted as an Orthogonal Frequency Division Multiplexing (OFDM) frame that comprises a preamble section and a data payload section.

Figure 2:
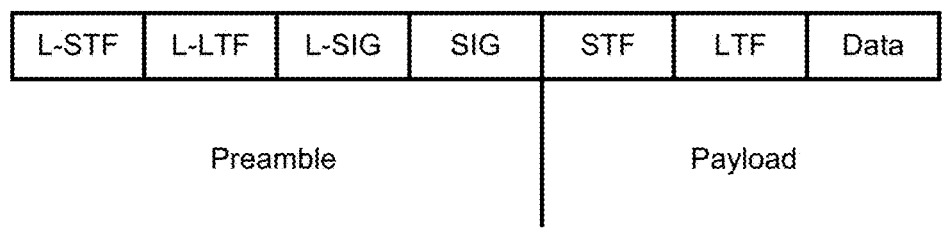
FIG. 2 illustrates an orthogonal sequence based reference signal (OSRS) frame format according to an embodiment of the present disclosure.

Accordingly, FIG. 2 depicts an OFDM frame according to an embodiment of the present disclosure. The OFDM frame comprises an OFDM symbol. The OFDM symbol includes data tones and pilot tones. As noted above, AP 110 transmits the OFDM frame, containing a preamble section and a payload section. The preamble section may include legacy short training field (L-STF), legacy long training field (L-LTF), legacy signal field (L-SIG) and signal field (SIG). The payload section may include a short training field (STF), a long training field (LTF), and communication payload data in the data payload.

In the preamble section, the L-LTF may provide information regarding channel estimation to recover the data in the SIG field of the preamble section. Meanwhile, in the payload section, reference signal (RS) data may carry certain information that pertains to the wireless channel, such as, for example, automatic gain control (AGC) and channel estimation parameters.

It will be appreciated that the depicted wireless communication frame format provides a representative example and that the present invention is not limited to such a format. That is, the communication frame formats may be different for SU-PPDU and MU-PPDU scenarios.

OSRS Indication in the EHT SIG Field

In accordance with the various embodiments presented by the instant disclosure, an orthogonal sequence-based RS (OSRS) for the multiple stream channel estimation and its indication in the EHT SIG field is proposed. As described above regarding the EHT scheme, the number of spatial streams is configured to extend to 16 streams. In order to support 16 stream channel estimation according to the IEEE 802.11 LTF schemes, 16 LTFs are required.

In the OSRS scheme, if 16 different orthogonal sequences corresponding to each transmission (TX) stream are used, those 16 different sequences may be overlapped into one symbol and transmitted, thereby reducing the maximum symbol length from 256 s to just 16 s. The proposed RS scheme may then be incorporated within the current LTF scheme.

The segment or block-based RS scheme may also be configured to provide a single channel estimation parameter averaged over the 16 sequences in case the segment (or block) size is 16 sequences. In this manner, there is one channel estimation parameter for every 16 sequences. The 16 different orthogonal sequences with length of 16 may be effectively generated with an orthogonal code scheme, such as, for example, a Hadamard coding scheme.

In accordance with the Hadamard coding scheme, one of the 16 sequences having a length of 16 is configured to correspond to each one of the 16 streams. As such, STA 120 may run cross correlations (or inner product) with all of these 16 sequences and obtain one averaged channel parameter for every stream over 16 sequences.

P-Matrix Design for 16 Streams LTF

For a normal LTF based reference signal (RS), a P-matrix design may be processed as follows.

$$P_{16 \times 16} = \begin{bmatrix} P_{8 \times 8} & P_{8 \times 8} \\ P_{8 \times 8} & -P_{8 \times 8} \end{bmatrix}$$

-continued $$P_{8\times 8} = \begin{bmatrix} P_{4\times 4} & P_{4\times 4} \\ P_{4\times 4} & -P_{4\times 4} \end{bmatrix}$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

The matrix $P_{16\times 16}$ may be formulated by $P_{8\times 8}$. In turn, the matrix $P_{8\times 8}$ may be formed from $P_{4\times 4}$. The matrix $P_{16\times 16}$ is shown only for illustrative purposes. Persons of ordinary skill in the art may envisage other matrix orthogonal combinations, in accordance with the principles and concepts of the disclosed embodiments.

In the embodiment of the present disclosure, a tone interleaved LTF (TIL) may be incorporated as an RS for channel estimation. The RS set in each stream is configured to have a different interleaved tone pattern but maintains the same tone distance (i.e., equidistant tone spacing). That is, for the case of 16 stream channel estimation, each RS set pattern has 16 tone distances between the sequences corresponding to the RS, but the sequence index corresponding to the RS is different.

For example, for the 1$^{st}$ stream, the RS pattern is positioned in the following tone index, [−122:16:−10][6:16:118], for the 2$^{nd}$ stream, [−121:16:−9][7:16:119], and for the 16$^{th}$ stream, [−107:16:−11][5:16:117]. The notation [a:b:c] means the tone index a to the tone index b with a step size of c tones. For details regarding these indexing schemes, refer to the publication of S. Mujtaba, entitled "TGn Sync Proposal Technical Specification", IEEE 802.11-04/0889r6, published on May 2005.

Given the RS set pattern and sequence index configuration, the channel estimation for each of the 16 tones relative to every data stream may be obtained. Moreover, the channel estimation for each of tones may be more accurately achieved by virtue of a channel smoothing scheme, such as Linear Interpolation, Wiener-Filtering etc.

According to the IEEE 802.11ax tone plan, the tones for which channel estimation is required are 242 tones per 20 MHz. However, for the MU-PPDU of IEEE 802.11ax, the tones that actually require channel estimation are 8 tones less—that is 234 tones (26 tones (2 pilots included)*9RU (Resource Unit)). Hence, because 240 is divisible by 16 or 8, a tone plan with 240 tones may be used instead of 234.

Accordingly, 15 orthogonal sequences with length of 16, or 30 orthogonal sequences with length of 8, may be allocated to the 240 subcarriers for every stream. Each stream may be allocated with a different set of 15 (or 30) orthogonal sequences. In accordance with FIG. 3, the 16 long sequences may be indexed as follows:

Segment 0: −122~−107; Segment 1: −106~−91; Segment 2: −90~−75

Segment 3: −74~−59; Segment 4: −58~−43; Segment 5: −42~−27

Segment 6: −26~−11; Segment 7: −10~−3 & 3~10; Segment 8: 11~26

Segment 9: 27~42; Segment 10: 43~58; Segment 11: 59~74

Segment 12: 75~90; Segment 13: 91~106; Segment 14: 107~122

The tone plan may be applied to both MU-PPDU and SU-PPDU. Hence, the tone index from −122 to −3 and from 3 to 122 may be used for OSRS or Quasi OSRS (QOSRS).

Figure 3:
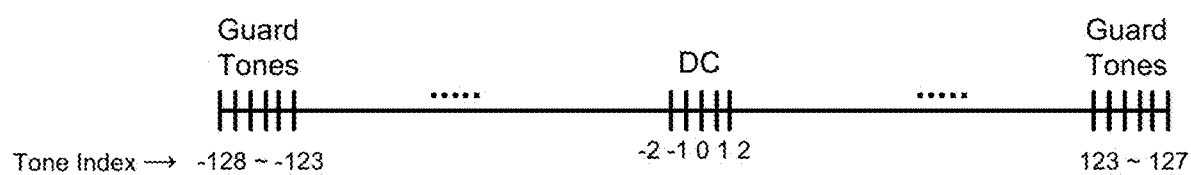
FIG. 3 shows an example of 20 MHz tone plan for the OSRS symbol according to an embodiment of the disclosure.

FIG. 3 shows an example of a 20 MHz tone plan for the OSRS symbol according to an embodiment of the disclosure. Theoretically, there are 256 tones for 16 streams, with each stream having 16 tones. In FIG. 3, the tone index begins from −128 to 127, including 5 tones for direct current (DC) subcarrier, 11 guard tones and 240 data and pilot tones. It will be appreciated that described tone plan only represents an example and the present disclosure is not limited to such tone plan. Artisans of ordinary skill may envisage other tone plans consistent with the principles and concepts of the disclosed embodiments. Moreover, it will be appreciated that the terms "subcarrier" and "tone" are identical in meaning and have therefore been used interchangeably in the description.

Orthogonal Sequence-Based RS Design

Figure 4:
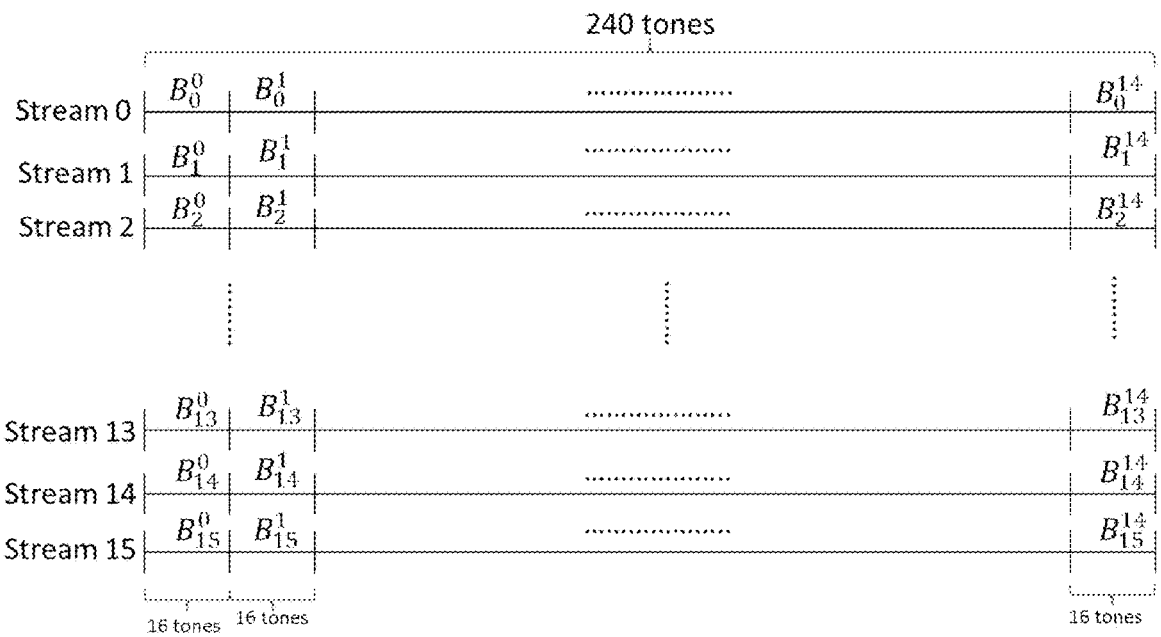
FIG. 4 shows 16 streams in a symbol of 16 tone segment based OSRS according to an embodiment of the present disclosure.

FIG. 4 illustrates 16 streams in an OSRS symbol according to an embodiment of the present disclosure. The 16 streams in FIG. 4 are purely for illustration purposes. Any number of streams up to 16 may be supported based on the disclosed segmentation techniques for segment-based RS.

In the depicted configuration, the length of the sequence may be variable as well. For example, if the 8 tone long sequence may be used to generate the orthogonal sequences, up to 8 streams may be supported by the design. However, in this case, there may be 30 segments per 240 tone OFDM symbol. A 240-tone sequence (i.e., the RS) is segmented into 15 tone blocks with 16 tones in each tone block.

In FIG. 4, $B_i^k$ represents a sequence with length 16 tones for the i$^{th}$ stream and for the k$^{th}$ segment. Each tone block is represented by $B_i^k$, where i represents the stream index and k represents the block index. For example, the RS for the stream 0 is segmented into 15 tone blocks $B_0^0$-$B_0^{14}$, with $B_0^0$ being the first tone block and $B_0^{14}$ being the last tone block of the RS for the stream 0. Similarly, the RS for the stream 15 is segmented into 15 tone blocks $B_{15}^0$-$B_{15}^{14}$.

Each tone block for a stream is configured to be orthogonal to the tone block at the corresponding position (i.e., the same block index) for another stream. That is, $B_i^k$ and $B_j^k$ for i different from j$B_i^k$ should be orthogonal to each other. In other words, $B_i^k \perp B_j^k$, which means that the k$^{th}$ tone block for stream i and the k$^{th}$ tone block for stream j are orthogonal to each other.

Therefore, the received signal for the k$^{th}$ tone block ($Y^k$) may be characterized by the following equation:

$$Y^k = \sum_{i=0}^{N-1} h_i B_i^k + n$$

in which, the scalar $h_i$ value represents $h_i$ is the channel parameter for the i$^{th}$ stream and n represents Additive White Gaussian Noise (AWGN). The scalar $h_i$ value may be obtained by evaluating all of the $h_i^k$ values based on the following equation, $$h_i^k = (B_i^k)^H Y^k / N$$

where N is the number of total streams that have been transmitted. The evaluation of the $h_i^k$ values to arrive at the scalar $h_i$ value may be achieved by performing the inner product processing of the $B_i^k$ and $Y^k$ vectors.

It will be appreciated that the principle described above may be easily extended and applied for the 8 stream case with 8 different orthogonal sequences and each sequence with the length 8 tones. Because $h_i$ is a complex scalar value, there may be one estimated channel parameter for every 16 sub-carriers or 8 sub-carriers, depending on the length of the sequence.

Hadamard Codes

Figure 5:
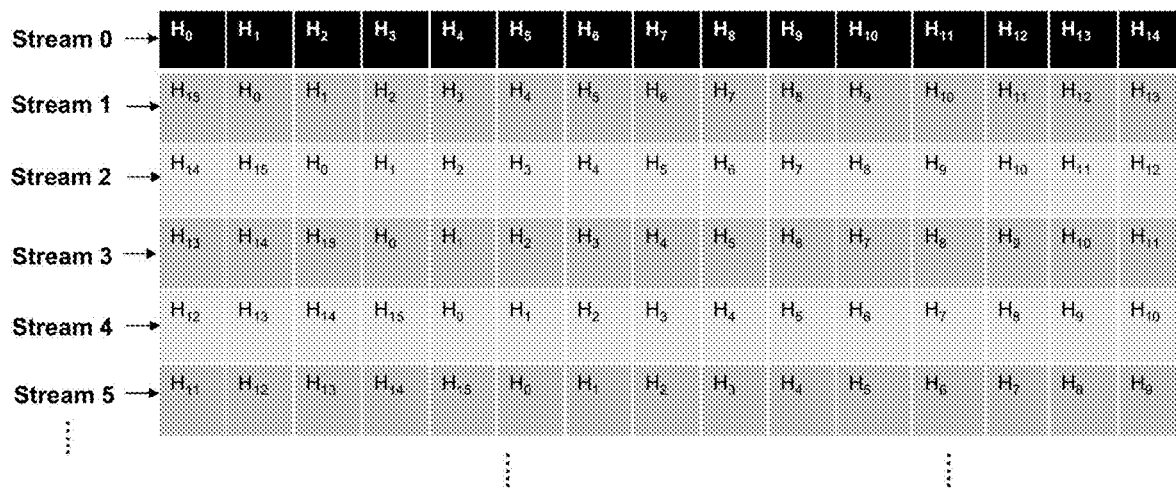
FIG. 5 depicts an example assignment of Hadamard codes to tone blocks of 16 streams according to some embodiments.

In some embodiments, Hadamard codes may be used to generate the RS encompassing the 240 tone plan noted above. The Hadamard codes with length 16: H0, H1 . . . and H15, may be used to generate 16 orthogonal sequences with the sequence length 16. FIG. 5 illustrates an embodiment of assigning Hadamard codes to tone blocks of 16 streams. The 16 streams in FIG. 5 are for illustration purposes. Any number of streams up to 16 may be supported based on the techniques disclosed herein.

As indicated by FIG. 5, the first 15 16-sequence Hadamard codes (H0-H14) may be assigned to the 15 blocks of the stream 0. For stream 1, the $16^{th}$ 16-sequence Hadamard code (H15) may be assigned to the first tone block, followed by the first 14 16-sequence Hadamard codes (H0-H13) to form stream 1, and so on. All streams 1-16 may be formed in a similar manner. It is to be noted that the scheme described above is only an example for forming Hadamard codes for the streams 0-15. Other arrangements for each Hadamard code may be used according to the orthogonal requirement discussed above.

Because all of the tone blocks are orthogonal to each other, the unique channel estimation for each stream for every block may be obtained. In order to obtain better channel parameters for each subcarrier, an additional smoothing process may be optionally employed for the estimated channel, as noted as above, such as, for example Wiener filtering or interpolation, etc.

Figure 6:
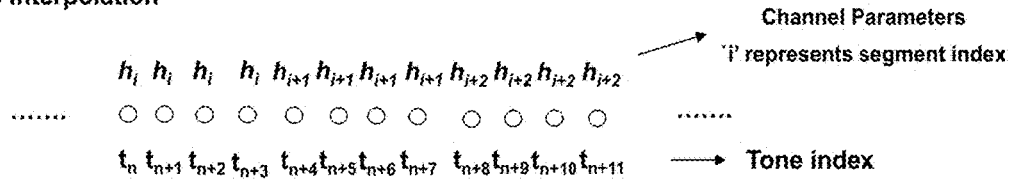
FIG. 6 shows a middle-tone based linear interpolation for OSRS design according to an embodiment of the present disclosure.
Figure 6:
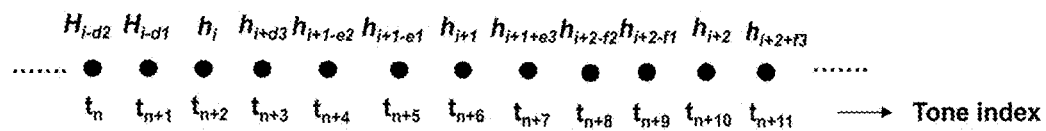

FIG. 6 depicts linear interpolation for OSRS design according to an embodiment of the present disclosure. As shown in FIG. 6, $h_{i+d3}$, $h_{i+1-e2}$, $h_{i+1-e1}$ represent the channel parameters obtained by the interpolation between $h_i$ and $h_{i+1}$. As seen from FIG. 6, the interpolation is done based on the middle channel parameters of each segment. That is, the channel parameter estimated for every segment corresponds to the middle tone of the segment. The present invention is not limited to the linear interpolation. A person skilled in the art may envisage other interpolation methods for OSRS design.

Simulation Results for OSRS Design

Figure 7:
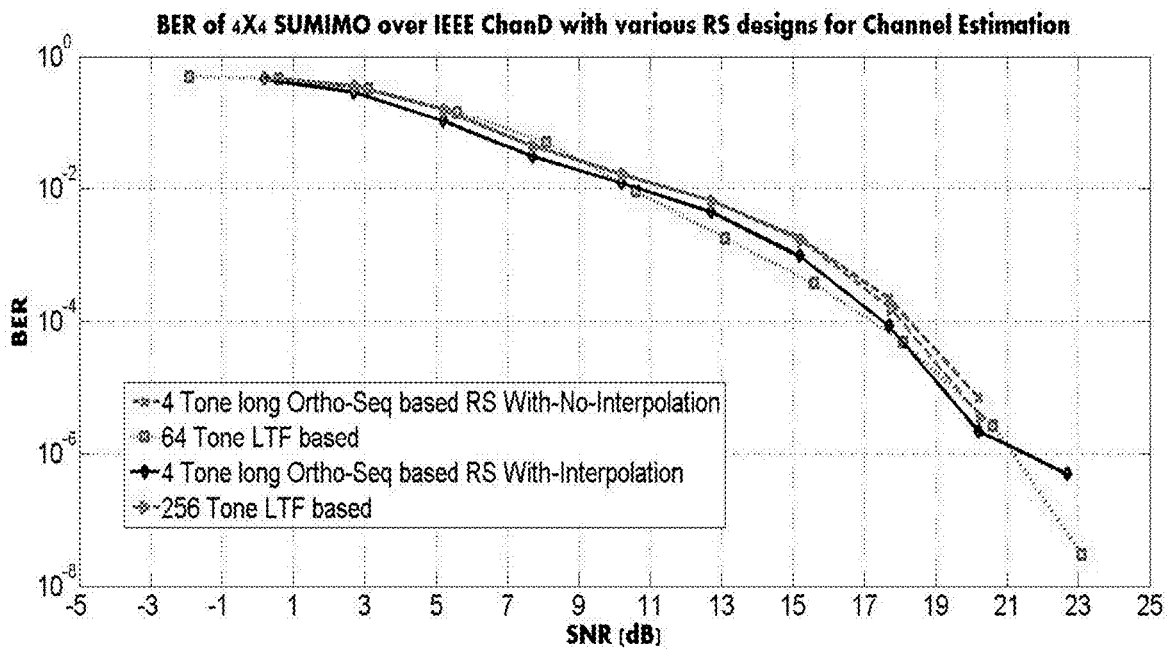
FIG. 7 shows four simulation results of Bit Error Rate (BER) of 4×4 Single User-Multiple Input Multiple Output (SU-MIMO) over IEEE ChanD with various RS designs for channel estimation according to an embodiment.

In order to compare the OSRS designs, simulations were conducted using the following parameters:
4×4 Open-loop SU-MIMO
    4 SS, 4 TX, 4 RX, Quadrature Phase Shift Keying (QPSK) and Minimum Mean Square Error (MMSE) detection
    Convolutional Encoding and its Viterbi decoding for the Forward Error Correction Codes (FEC)
    MCW (Multi Codeword), separate FEC is applied to each stream
Scenario for Channel Estimation Reference Signal
    11ac LTF based (64 point OFDM symbols)
    11ax LTF based (256 point OFDM symbols; 4× LTF is used)
    OSRS with each segment length, 4 tones
        There are 60 segments in an OFDM symbol
            Estimated Channel parameter for every segment is the same, that is, the same over every 4 tone
    OSRS with each segment length, 4 tones
        There are 60 segments in an OFDM symbol
        Linear Interpolation is performed for those 60 estimated channel parameters to come up with 240 channel parameters for each 240 tones FIG. 7 illustrates four simulation results of BER of 4×4 SU-MIMO over IEEE ChanD with various RS designs for channel estimation. The performance of using the OSRS shows almost no degradation compared to the 802.11 LTF based RS design.

The graph with the interpolation indicates about 0.5 dB better performance than the 256 tone LTF based RS. This is because the interpolation functions as a smoothing process which improves the performance. The gain is in the overhead reduction—in particular, there are 4 LTFs but there is only one symbol for OSRS.

Figures 8, 9:
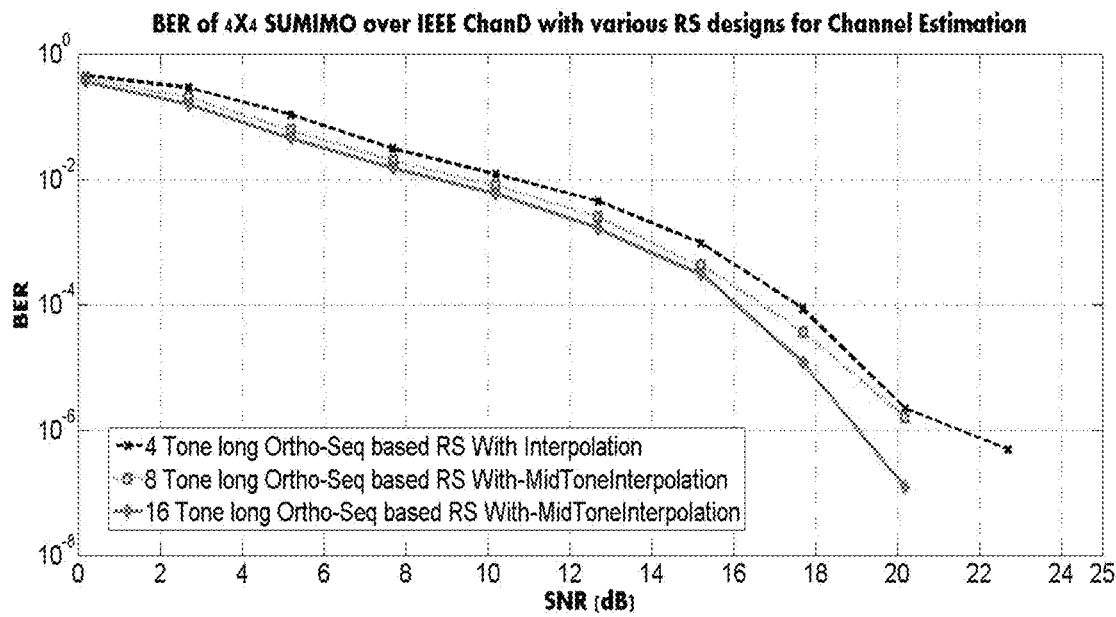
FIG. 8 shows three simulation results of BER of 4×4 SU-MIMO over IEEE ChanD with various RS designs for channel estimation according to an embodiment of the present disclosure.
FIG. 9 illustrates 16 different quasi orthogonal sequences generated according to an embodiment of the present disclosure.

FIG. 8 illustrates three simulation results of BER of 4×4 SU-MIMO over IEEE ChanD with various RS designs for channel estimation according to an embodiment of the present disclosure. In this configuration, the IEEE 802.11ax based SU-PPDU is used. The three channel estimations are all configured to apply to the interpolation. Based on the results, it appears that the longer the sequence is, the better the performance. In other words, the length of the sequence may be regarded as a smoothing window size to process the sequence. The larger the smoothing window size is, the better the performance of the channel estimation result may get.

Quasi Orthogonal Sequence-Based Reference Signal (QOSRS)

As shown in FIG. 8, in case of open loop SU-MIMO scheme, the larger the OSRS size is, the better the performance. However, in a close loop scheme that applies beam forming (BF) operations, such as, for example, in MU-MIMO scenarios, it is observed that the shorter the OSRS size performs better. This may be due to the fact that during BF, the phase between data tones within a data frame may become discontinuous. Therefore, the configuration of OSRS may depend on the length of the sequence in determining the maximum number of streams to estimate.

For example, there are 16 different sequences of length 16 which are orthogonal to each other, which is sufficient to support the channel estimation for up to 16 spatial stream channels. This performs well when the MIMO is not a closed loop MIMO (i.e., no BF). In other words, for open loop MIMO channel estimation, the longer the length of the sequence is, the better the performance. However, when MIMO is BF-based, such as MU-MIMO, it is observed that the 16 long sequences do not perform well for the IEEE ChanD Non Line of Sight (NLOS) scheme. In fact, it is found that the 8 long sequences perform well for the IEEE ChanD NLOS.

Because the 8 long sequences may support a maximum of 8 streams, a quasi OSRS (QOSRS) may be employed to extend the number of streams to support the channel estimation.

QOSRS: Hadamard Code-Based Design

In addition to 8 orthogonal Hadamard sequences (with the length of 8), 8 more quasi orthogonal sequences may be created, which satisfy the condition that the magnitude of the inner product between one of the orthogonal sequences (OSs) and one of the quasi orthogonal sequences (QOSs) or between two quasi orthogonal sequences is 4.

That is, $\|(B_i^k)^H B_j^k\| = 4$, when i and j are different.

In this case, the magnitude becomes 8 when i and j are identical, which means the channel may be estimated when the inner product is applied to the received signal with any sequence i. Although there are still remaining interferences, the performance degradation due to the remaining interferences may be observed to be minimal.

For example, in addition to the 8 Hadamard orthogonal sequences, the following 8 quasi orthogonal sequences may satisfy the condition above:

[1 1 1 1 j j −j −j],[1 1 1 1 −j −j j j],[1 1 −1 −1 j j j j],[1 1 −1 −1 −j −j −j −j],

[1 1 j j 1 1 −j −j], [1 1 j j −1 −1 j j],[1 1 −j −j 1 1 j j], [1 1 −j −j −1 −1 −j −j]

The above QOS is illustrative only and the present invention is not limited to such configuration. Any other QOS arrangement may be used to a person skilled in the art.

QOSRS: Zadoff-Chu Sequence-Based Design

According to the Hadamard code-based design above, the interference portion (i.e., the inner product between OS and QOS or between QOS when i and j are different) of the Hadamard code based QOS design still remains. Hence, a Zadoff-Chu sequence-based QOS design may be proposed. That is, $\|(B_i^k)^H B_j^k\| < 4$, when i and j are different.

In this Zadoff-Chu sequence-based QOS design, unlike the Hadamard code scheme described above, the magnitude becomes zero, just like the orthogonal codes most of the time, but in rare instances the magnitude may become slightly smaller than or equal to 4. Hence, the interference portion is much smaller than in the Hadamard code-based QOS design. The Zadoff-Chu sequence may be characterized by the following relationship:

$$x_u(n) = \exp\left(-j\frac{\pi u n(n + c_f + 2q)}{N_{ZC}}\right)$$

where $N_{ZC}$ is the length of sequence, (in this scenario it is 8); n is the sequence index; $0 < u < N_{ZC}$ and $\gcd(N_{ZC}, u) = 1$; $c_f = N_{ZC}$ mod 2 (in this scenario it is assumed to be 1); and q=0 produces a Chu sequence.

First of all, 4 different Zadoff-Chu based orthogonal sequences with length of 8 may be generated by setting u=1, 3, 5, and 7. Second, for each orthogonal sequence generated in the first step, 3 quasi orthogonal sequences may be spawned by cyclically shifting 2 sequence indexes to the right.

That is, if the orthogonal sequence generated by one of the u values is: [a+jb, c+jd, e+jf, g+jh, k+jm, n+jo, p+jq, r+js], then the first spawned quasi orthogonal sequence is: [p+jq, r+js, a+jb, c+jd, e+jf, g+jh, k+jm, n+jo], the second spawned quasi orthogonal sequence is: [k+jm, n+jo, p+jq, r+js, a+jb, c+jd, e+jf, g+jh], and the third spawned quasi orthogonal sequence is: [e+jf, g+jh, k+jm, n+jo, p+jq, r+js, a+jb, c+jd].

The principle described above may be applied to the other orthogonal sequences generated by other u values. For example, those 16 different quasi orthogonal sequences generated according to the procedures above are given in FIG. 9. 16 Zadoff-Chu based Quasi Orthogonal Sequences are shown in the table, with 4 of them generated by 4 different u values, and with 12 of them generated by cyclically shifting two sequence indexes successively.

Phase Continuity in Beam-Formed Frames

As briefly noted above, when beam-forming (BF) is applied to a data frame, the phase may become discontinuous between the data tones, making it difficult to estimate the channel by interpolation. A phase continuity process may be applied during the BF in order to avoid the phase discontinuity issues. Moreover, channel estimation performed during a sounding process should be based on the 802.11 LTF based reference signal in order to measure the CSI information. The CSI information may be obtained for every tone when Ng=1, Ng referring to the number of tone groups Denote $P_0, P_1, P_2, \ldots$ to be pre-coding matrices for each tone 0, 1, 2, ... etc., based on the CSI information obtained above, the continuous phase pre-coding matrices may be $P_0$, $P_1 e^{j\varphi_1}$, $P_2 e^{j\varphi_2}, \ldots$ $\varphi_1 = \min_{angle} \|P_0 - P_1 e^{j\varphi_1}\|, \varphi_2 = \min_{angle} \|P_2 e^{j\varphi_2} - P_1 e^{j\varphi_1}\|,$ etc $\|P_0 - P_1 e^{j\varphi_1}\|^2 = (P_0 - P_1 e^{j\varphi_1})^H (P_0 - P_1 e^{j\varphi_1}) = P_0^H P_0 - P_1^H e^{-j\varphi_1} P_0 - P_0^H P_1 e^{j\varphi_1} + P_1^H P_1 = -2\{P_1^H e^{-j\varphi_1} P_0\}$ $\max \text{Re}_{\varphi_1}[P_1^H P_0 e^{-j\varphi_1}] = \max \text{Re}_{\varphi_1}[P_0^H P_1 e^{j\varphi_1}]$ Therefore, $\varphi_1 = -\text{phase}(P_0^H P_1)$, $\varphi_2 = -\text{phase}(T_1^H P_2)$, where $T_1$ here is the updated $P_1 e^{j\varphi_1}$ with phase continuity. In the same way, $\varphi_3 = -\text{phase}(T_2^H P_3)$, etc.

Simulation Results for Beam-Formed Frames

Simulation trials were conducted under the following conditions:

8 TX MU-MIMO may be scheduled with 2 STAs, each STA scheduled with 4 streams and modulated in QPSK.

8 TX MU-MIMO may be scheduled with 4 STAs (each 2 streams and in QPSK).

Hadamard code based QOSRS vs Zadoff-Chu sequence based QOSRS

Perfect sounding (No AWGN during Sounding, No CSI Quantization error, No CSI feedback error, but real channel estimation using the LTFs)

Limited CSI feedback error (No CSI Quantization error, No CSI feedback error, but real channel estimation using the LTFs)

Zero-forcing BF in the TX, and MMSE detection in each STA

Figure 10:
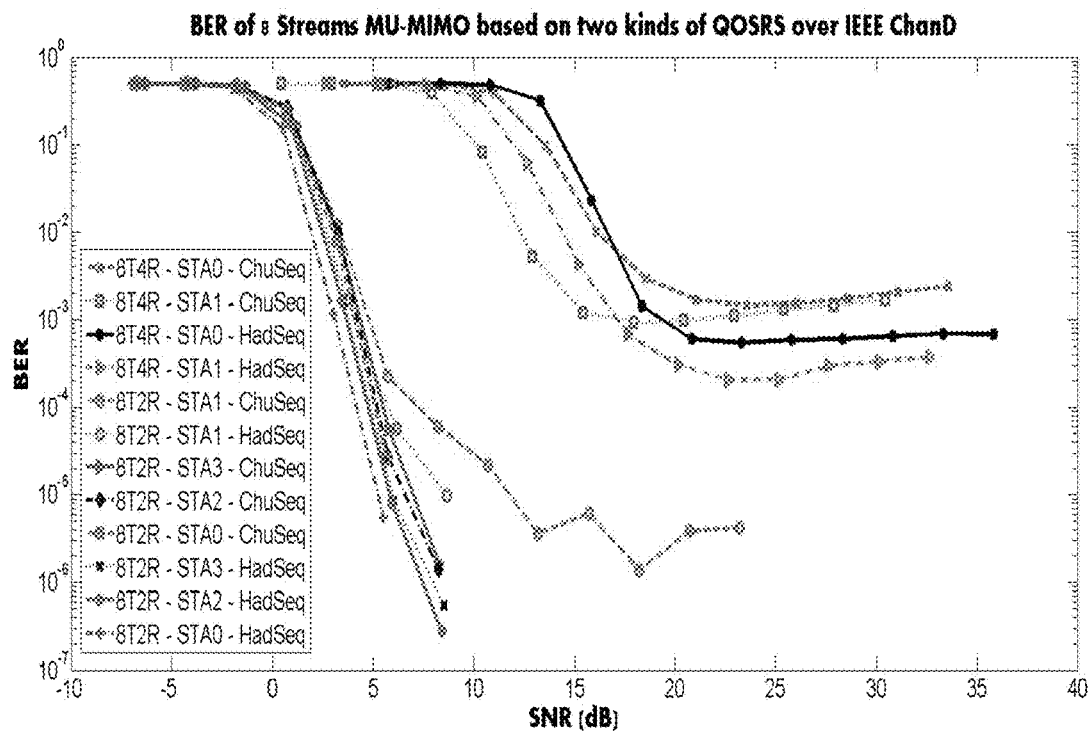
FIG. 10 shows the performance for the MU-MIMO frame based on Quasi OSRS (QOSRS) No Additive White Gaussian Noise (AWGN) during the sounding period according to an embodiment of the present disclosure.

Common simulation parameters
Convolutional Encoding and its Viterbi decoding are used as FEC
Multi Codeword (MCW), separate FEC is applied to each stream FIG. 10 illustrates the performance for the BF frame based on QOSRS with no AWGN during the sounding period. In perfect sounding, for the two receivers (i.e. two antennas) case, the results are acceptable. The Hadamard code based QOSRS has better performance.

Figure 11:
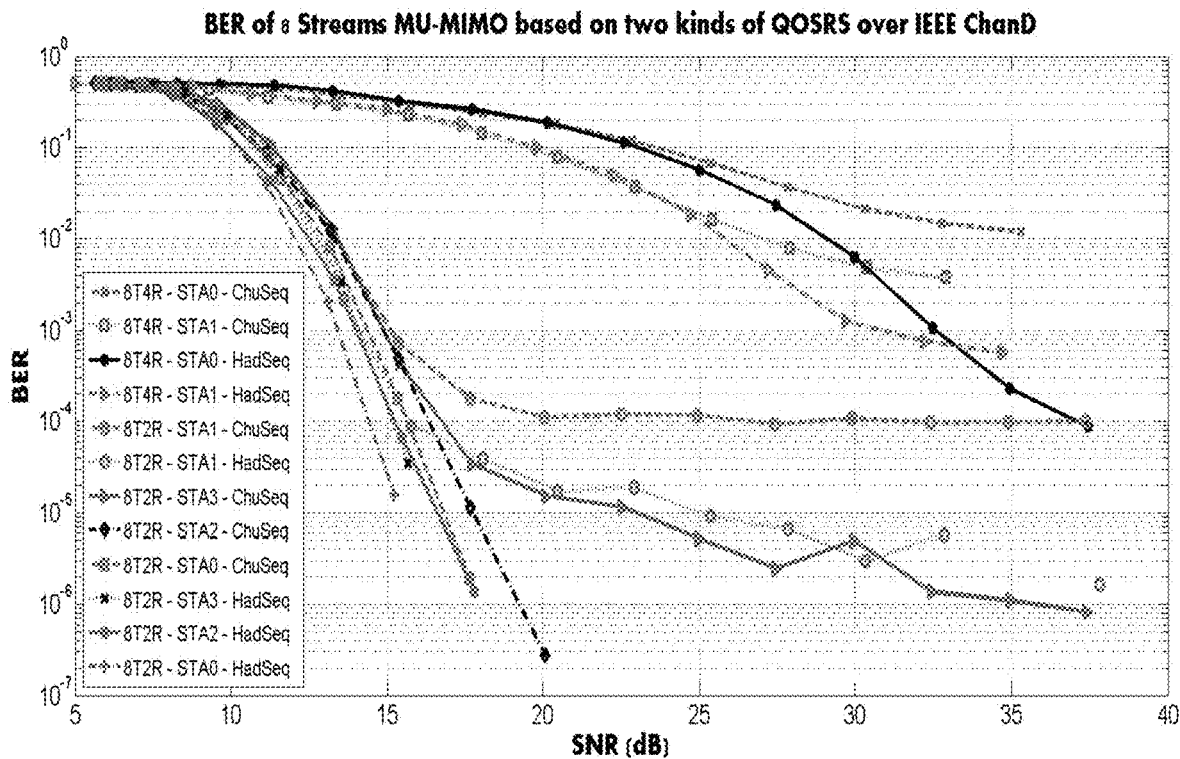
FIG. 11 shows the performance for the MU-MIMO frame based on QOSRS with AWGN during the sounding period according to an embodiment of the present disclosure.

FIG. 11 shows the performance for the BF frame based on QOSRS with AWGN during the sounding period. Comparatively, for most of Hadamard code based QOSRS, the figure shows better results.

Tone Interleaved LTF (TIL)

Figure 12:
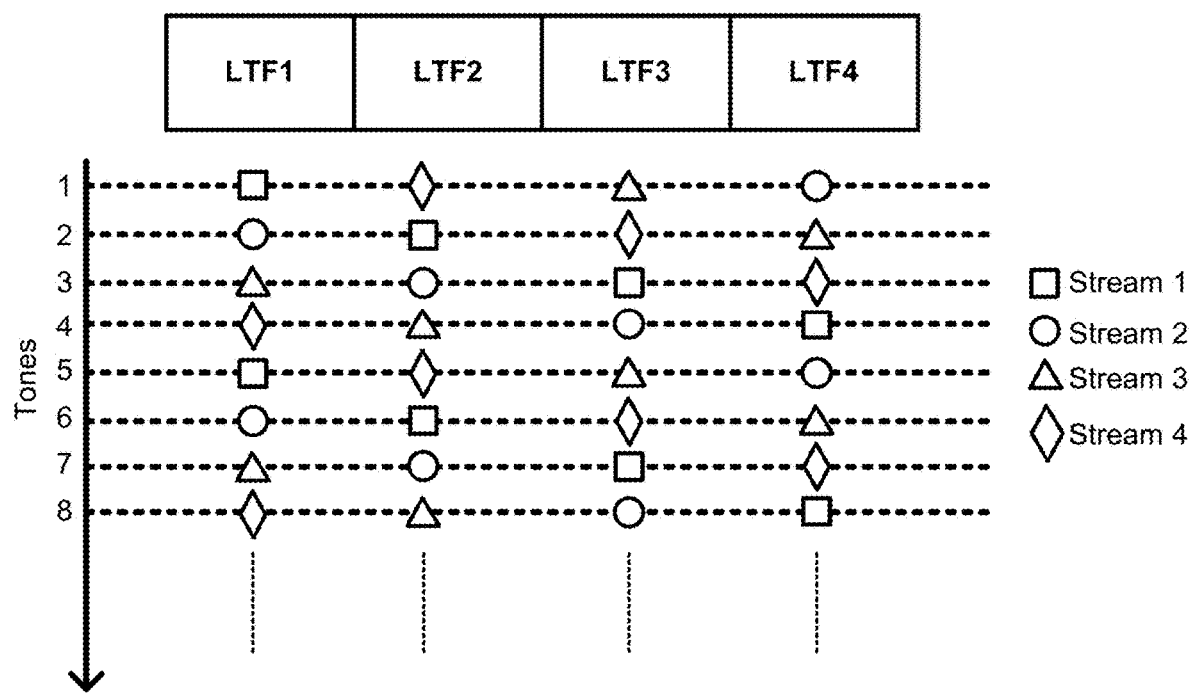
FIG. 12 shows an example of how Tone Interleaved LTF (TIL) based RS may work using the 4 stream and 4 LTF based TIL according to an embodiment of the present disclosure.

FIG. 12 depicts an example of how TIL-based RS may operate using the 4 stream and 4 LTF-based TIL. As seen from the figure, the different shape represents the RS corresponding to each stream. TIL-based RS may be used with any number of LTFs. The more LTFs, the more accurate channel estimation gets achieved.

As discussed above, the TIL-based RS set in each stream is configured to have a different interleaved tone pattern but maintains the same tone distance (i.e., equidistant tone spacing). Because there are 4 streams for the example in FIG. 12, the tone distance between each RS for every stream is 4 tones. The depicted square represents the RS of the $1^{st}$ stream, the circle represents the RS of the $2^{nd}$ stream, the triangle represents the RS of the $3^{rd}$ stream and the lozenge represents the RS of the $4^{th}$ stream. There are 4 LTF symbols, and all the tones for every stream are occupied with the RS. Thus, the channel estimation for every tone may be recovered.

However, for the case of flat fading or the frequency selective channel close to flat fading, the number of LTFs may be reduced, so that the channel estimation for all the tones may be optionally obtained with a channel smoothing scheme such as a Linear Interpolation or a Wiener Filtering. As such, fewer LTFs than the number of streams may be used for the estimation of the channel parameters. As for the same number of TIL based LTFs, the performance is better than the same number of LTFs for the 802.11ac based LTFs.

RS Indication

According to the 802.1 lax High Efficiency (HE) SIG-A design, there is a field to indicate the size of high efficiency-LTF(HE-LTF) in combination with the Guard Interval (GI) duration, which only considers 1×, 2×, and 4× LTF. The 4× LTF implies all the tones per OFDM symbol are occupied with RS, whereas 1× or 2× LTF means a quarter or a half of the sub-carriers per OFDM symbol, respectively. That is, 1× or 2× LTF requires an additional smoothing process such as linear interpolation or Wiener filtering to obtain the channel estimation for all the sub-carriers per symbol.

Hence, the 1× or 2× LTF may be selected by an AP when the channel is relatively less frequency selective. However, the LTF based RS is limited to a 1× LTF maximum in order to reduce the number of sub-carriers per symbol that are used for RS. In case the channel is so flat that even 1× LTF may be considered an over-design to occupy every 4 sub-carriers with RS, it is proposed to use the orthogonal sequence based RS with length 8 or 16 subcarriers.

In this case, the channel estimation is done every 8 or 16 sub-carriers. The length 8 sequence based RS may be used for the estimation of 8 streams or below, and the length 16 sequence based RS may be used for the estimation of 16 streams or below.

As such, using the Orthogonal Sequence-based RS design results in the reduction of OFDM symbols for RS. Only one 4× OFDM symbol is good enough for the Orthogonal Sequence based RS regardless of the number of streams, whereas the LTF based RS requires N OFDM symbol based LTFs for N Spatial Streams. The similar reduction in the number of symbols for the RS may be achieved with TIL.

Therefore, additional indication bits in EHT SIG-A may be required in addition to two bits of the current HE SIG-A. At least a bit may be required to indicate the length 8 based or 16 based Orthogonal Sequence for the RS, and more bits may be necessary to indicate the Quasi Orthogonal Sequence based RS. However, for the case of TIL, more than one bit may be needed to indicate, because the number of sub-carriers to be recovered through the interpolation is determined by the number of TX streams and the number of TIL symbols.

For example, as for 8 TX streams, in case there is only 1 TIL symbol, every eighth sub-carrier is occupied with RS for every stream. If the number of TIL symbols is increased to 2, then the number of sub-carriers to be recovered through the interpolation may be reduced from 8 to 4. Hence, more bits may be needed to represent the combination of TIL symbols with the number of streams to estimate in the EHT SIG-A field.

Overall, the above proposal may reduce the number of RS symbols, and thus reduce the overall overhead which is required for the channel estimation. This is particularly useful for the high number of TX streams case such as 8 or 16 streams.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A method for transmitting multiple data streams in a Wireless Local Area Network (WLAN), comprising:
   transmitting, by an access point (AP), an orthogonal frequency division multiplexing (OFDM) frame comprising a preamble section and a data payload section, in which the preamble section includes a field that contains an indication of Extreme High Throughput (EHT) operations and a corresponding reference signal (RS) data configuration, and the data payload section includes communication payload data and the configured RS data related to attributes of a wireless channel,
   wherein, based on the preamble field indication for EHT operations, the corresponding configured RS data includes a plurality of data tones that are segmented into tone blocks having a configuration comprising one of:
   an orthogonal sequence-based RS (OSRS) that includes orthogonal tone blocks,
   a quasi-orthogonal sequence-based RS (QOSRS) that includes quasi-orthogonal tone blocks, or
   a tone interleaved lone training field (TIL)-based RS that includes interleaved tone patterns with equidistant tone spacing.

2. The method of claim 1, wherein the RS data incorporates 240 data tones for transmission and the OFDM frame comprises an OFDM symbol that contains 5 direct current (DC) tones and 11 guard tones.

3. The method of claim 1, wherein the RS data includes wireless channel estimation information attributes.

4. The method of claim 2, wherein the 240 data tones are segmented into 15 tone blocks with 16 tones in each tone block.

5. The method of claim 4 wherein, for the OSRS, each tone block is represented by $B_i^k$, where i represents stream index and k represents the block index and wherein the kth tone block for stream i and the kth tone block for stream j are mutually orthogonal, represented as $B_i^k \perp B_j^k$.

6. The method of claim 4 wherein, for the QOSRS, each tone block is represented by $B_i^k$, where i represents stream index and k represents the block index and wherein the inner product between two tone blocks is represented by the following relationship:

$$\|(B_i^k)^H B_j^k\| \leq 4, \text{ when } i \text{ and } j \text{ are different.}$$

7. The method of claim 1 wherein, for the TIL-based RS, the RS interleaved tone pattern for each stream is different with equidistant tone spacing.

8. The method of claim 2, further comprising applying a channel smoothing scheme to the data tones.

9. The method of claim 8, wherein the channel smoothing scheme comprises Wiener filtering or linear interpolation of the data tones.

10. The method of claim 1, wherein the preamble section includes a 2-bit indication to identify a size of a lone training field (LTF) for the EHT operations and a Guard Interval (GI) duration.

11. The method of claim 10, wherein the preamble section further includes additional bits to indicate the length 8 OSRS or the length 16 OSRS or TIL-based RS.

12. A method for receiving multiple data streams in a Wireless Local Area Network (WLAN), comprising:
   receiving, by a station (STA), an orthogonal frequency division multiplexing (OFDM) frame, the OFDM frame comprising a preamble section and a data payload section, in which the preamble section includes a field that contains an indication of Extreme High Throughput (EHT) operations and a corresponding reference signal (RS) data configuration, and the data payload section includes communication payload data and the configured RS data related to attributes of a wireless channel, wherein, based on the preamble field indication of EHT operations, the corresponding configured RS data includes a plurality of data tones segmented into tone blocks having a configuration comprising one of:

an orthogonal sequence-based RS (OSRS) that includes orthogonal tone blocks, a quasi-orthogonal sequence-based RS (QOSRS) that includes quasi-orthogonal tone blocks, or a tone interleaved long training field (TIL)-based RS that includes interleaved tone patterns with equidistant tone spacing.

13. The method of claim 12, further comprising performing a channel estimation process to the communication payload data in accordance with the data payload section of the OFDM frame.

14. The method of claim 13, wherein the RS data incorporates 240 data tones for transmission, and the OFDM frame comprises an OFDM symbol that contains 5 direct current (DC) tones and 11 guard tones.

15. The method of claim 14, wherein the 240 data tones are segmented into 15 tone blocks with 16 tones in each tone block.

16. The method of claim 15, wherein a received signal for the kth tone block $Y^k$ is characterized by the following equation:

$$Y^k = \sum_{i=0}^{N-1} h_i B_i^k + n$$

wherein the scalar $h_i$ value is obtained by evaluating all of the $h_i^k$ values based on the following equation, $h_i^k (B_i^k)^H Y^k / N$ where N is the number of streams transmitted.

17. The method of claim 12, wherein the preamble section includes 2 bit indication to identify a size of a lone training field (LTF) for the EHT operations and a Guard Interval (GI) duration.

18. The method of claim 17, wherein the preamble section further includes additional bits to indicate the length 8 OSRS or the length 16 OSRS or TIL-based RS.

19. An access point (AP) for transmitting multiple data streams in a Wireless Local Area Network (WLAN), the AP configured to:

transmit an orthogonal frequency division multiplexing (OFDM) frame comprising a preamble section and a data payload section, in which the preamble section includes a field that contains an indication of Extreme High Throughput (EHT) operations and a corresponding reference signal (RS) data configuration, and the data payload section includes communication payload data and the configured RS data related to attributes of a wireless channel, wherein, based on the preamble field indication of EHT operations, the corresponding configured RS data includes a plurality of data tones segmented into tone blocks having a configuration comprising one of:

an orthogonal sequence-based RS (OSRS) that includes orthogonal tone blocks, a quasi-orthogonal sequence-based RS (QOSRS) that includes quasi-orthogonal tone blocks, or a tone interleaved long training field (TIL)-based RS that includes interleaved tone patterns with equidistant tone spacing.

20. The AP of claim 19, wherein the RS data incorporates 240 data tones for transmission, and the OFDM frame comprises an OFDM symbol that contains 5 direct current (DC) tones and 11 guard tones.

21. The AP of claim 19, wherein the RS data includes channel estimation information attributes.

22. The AP of claim 20, wherein the 240 data tones are segmented into 15 tone blocks with 16 tones in each tone block.

23. The AP of claim 22 wherein, for the OSRS, each tone block is represented by $B_i^k$, where i represents stream index and k represents the block index and wherein the kth tone block for stream i and the kth tone block for stream j are mutually orthogonal, represented as $B_i^k \perp B_j^k$.

24. The AP of claim 22 wherein, for the QOSRS, each tone block is represented by $B_i^k$, where i represents stream index and k represents the block index and wherein the inner product between two tone blocks is represented by the following relationship:

$\|(B_i^k)^H B_j^k\| \leq 4$, when $i$ and $j$ are different.

25. The AP of claim 19 wherein, for the TIL-based RS, the RS interleaved tone pattern for each stream is different with equidistant tone spacing.

26. The AP of claim 20, wherein the AP applies a channel smoothing scheme to the data tones.

27. The AP of claim 26, wherein the channel smoothing scheme comprises Wiener filtering or linear interpolation of the data tones.

28. The AP of claim 19, wherein the preamble section includes a 2 bit indication to identify a size of a lone training field (LTF) for the EHT operations and a Guard Interval (GI) duration.

29. The AP of claim 28, wherein the preamble section further includes additional bits to indicate the length 8 OSRS or the length 16 OSRS or TIL-based RS.

30. A station (STA) for receiving data in a Wireless Local Area Network (WLAN), the STA configured to:

receive an orthogonal frequency division multiplexing (OFDM) frame, the OFDM frame comprising a preamble section and a data payload section, in which the preamble section includes a field that contains an indication of Extreme High Throughput (EHT) operations and a corresponding reference signal (RS) data configuration, and the data payload section includes communication payload data and the configured RS data related to attributes of a wireless channel, wherein, based on the preamble field indication of EHT operations, the corresponding configured RS data includes a plurality of data tones segmented into tone blocks having a configuration comprising one of:

an orthogonal sequence-based RS (OSRS) that includes orthogonal tone blocks, a quasi-orthogonal sequence-based RS (QOSRS) that includes quasi-orthogonal tone blocks, or a tone interleaved long training field (TIL)-based RS that includes interleaved tone patterns with equidistant tone spacing.

31. The STA of claim 30, wherein the STA is further configured to perform a channel estimation process to the communication payload data in accordance with the data payload section of the OFDM frame.

32. The STA of claim 31, wherein the RS data incorporates 240 data tones for transmission, and the OFDM frame comprises an OFDM symbol that contains 5 direct current (DC) tones and 11 guard tones.

33. The STA of claim 32, wherein the 240 data tones are segmented into 15 tone blocks with 16 tones in each tone block.

34. The STA of claim 33, wherein a received signal for the kth tone block $Y^k$ is characterized by the following equation:

$$Y^k = \sum_{i=0}^{N-1} h_i B_i^k + n$$

wherein the scalar h value is obtained by evaluating all of the $h_i^k$ values based on the following equation, $$h_i^k = (B_i^k)^H Y^*/N$$

where N is the number of streams transmitted.

35. The STA of claim 30, wherein the preamble section includes 2 bit indication to identify a size of a lone training field (LTF) for the EHT operations and a Guard Interval (GI) duration.

36. The STA of claim 35, wherein the preamble section further includes additional bits to indicate the length 8 OSRS, the length 16 OSRS or TIL-based RS.

* * * * *